METHOD OF STRINGING MAGNETIC CORE APPARATUS

Filed Sept. 9, 1965

INVENTOR.
MARLIN P. BAILLARGEON
BY
Braddock & Burd
ATTORNEYS

INVENTOR.
MARLIN P. BAILLARGEON
BY
Braddock & Burd
ATTORNEYS

United States Patent Office 3,427,711
Patented Feb. 18, 1969

3,427,711

METHOD OF STRINGING MAGNETIC CORE APPARATUS

Marlin P. Baillargeon, Deronda, Wis., assignor to Fabri-Tek Incorporated, Minneapolis, Minn., a corporation of Wisconsin Filed Sept. 9, 1965, Ser. No. 486,005
U.S. Cl. 29—604 3 Claims
Int. Cl. H01f 7/06; H03k 15/04

ABSTRACT OF THE DISCLOSURE

The improved method of stringing a sense winding through a magnetic core matrix including stringing two separate wires diagonally through one-half of the cores, each in the inverted mirror image of the other, and joining the wire to form a single sense winding within a single matrix to thus reduce the number sense winding cross-over points.

This invention is concerned with control apparatus, and more particularily with a method for improved production of memory storage apparatus including magnetic core matrices.

Bistable magnetic ring core memory storage systems have become well known in the art. When magnetic cores are used in various matrix arrangements it is necessary to string a plurality of windings through the center of the ring cores to enable control functions, such as read-write, to be performed on the cross. As more and various types of control functions are desired it is necessary to string more windings, and a noise signal may develop in a system such as a coincident-current magnetic core memory system, due to the increased inter-line capacitances.

The more levels of windings there are, the greater the possibility of inter-line capacitance. This problem is overcome in this invention by providing a method of threading a winding, such as a sense winding, so as to eliminate approximately half of the cross-over points of the winding, to thus cut down the number of winding levels and decrease the inter-line capacitance.

Further, the method of this invention decreases the production time, and thus the cost, of memory systems.

Briefly described, the method of this invention involves splitting a winding such as the sense winding, into a plurality of wires. The wires are then individually connected to a plurality of threading apparatus, such as needles. The plurality of wires are then simultaneously or alternatively threaded through the cores in a matrix, such that each core is threaded once by only one wire. When each core, or each desired core, has been threaded, the proper ends of the plurality of wires are spliced together to form a single sense winding.

Figure 1:
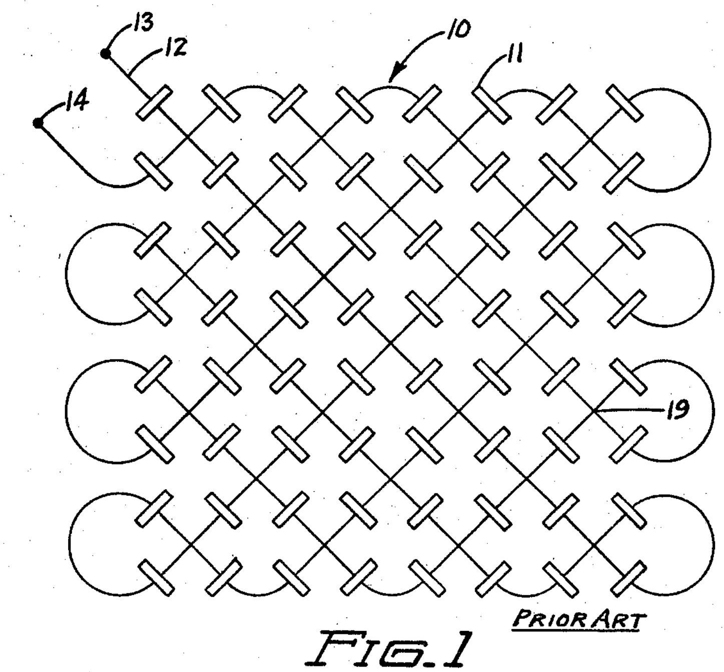
PRIOR ART FIG. 1
FIG. 1 is a top plan view of a bistable magnetic ring core matrix wound with a single line in a prior art pattern.
Figure 2:
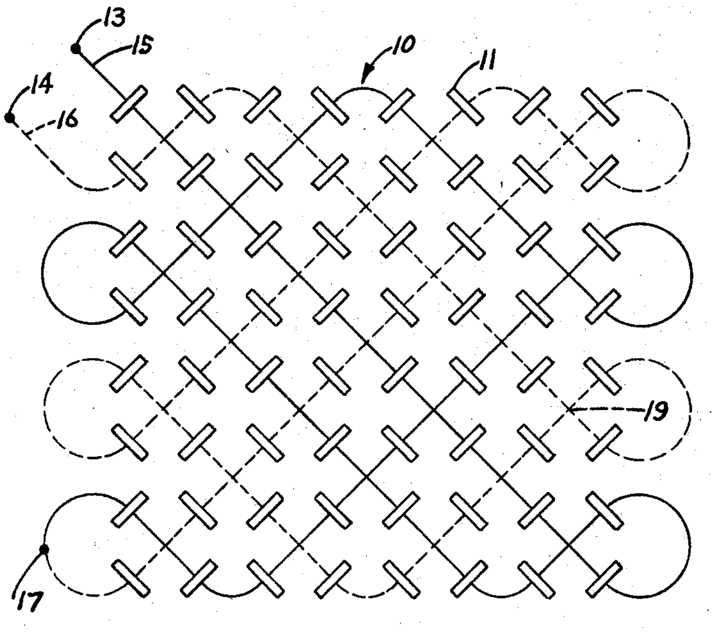
FIG. 2 is another top plan view of a magnetic core matrix wound in the method of this invention.
Figure 3:
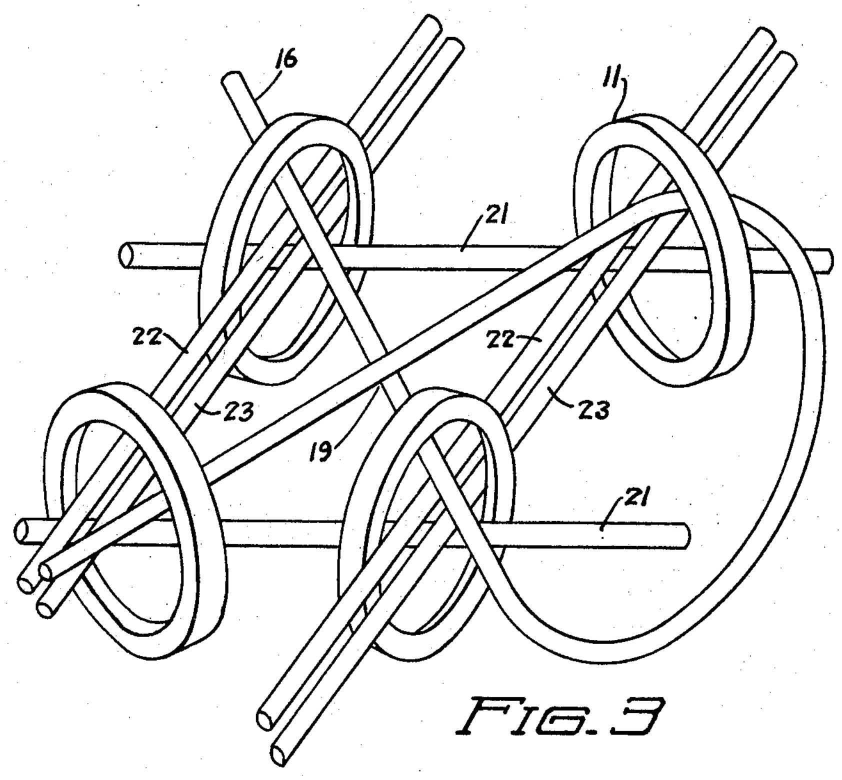
FIG. 3 is an enlarged perspective view of a group of cores showing various levels of cross-over due to a plurality of windings.
Figure 4:
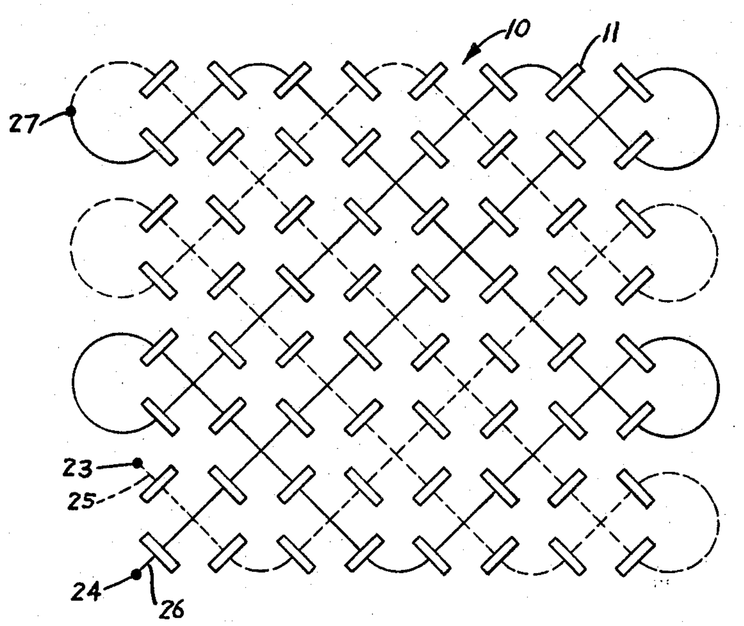
FIG. 4 is another top plan view of a magnetic core matrix wound with a variation of the method of this invention.

Referring to the prior art of FIG. 1, there is shown a matrix 10 comprised of a plurality of bistable magnetic core rings 11. A winding or wire 12, such as a sense winding, is shown beginning at point 13 and threading through each of cores 11 of matrix 10 and winding up at point 14. For clarity, the drawings of FIGS. 1, 2 and 4 show only a single winding, and not the plurality of other windings normally necessary to control a magnetic memory system. It is to be understood that these other windings are present, as shown in FIG. 3.

In FIG. 2 there is also shown a matrix 10 comprised of a plurality of cores 11. Here cores 11 are wound in the method of this invention which involves the use of a pair of windings or wires 15 and 16. Wire 16 is dotted for clarity. Wire 15 may be connected to a threading device such as a needle (not shown) and wound, for example, from point 13 through cores 11 as shown, terminating at junction point 17. Simultaneously, or alternatively, winding 16 may be connected to another needle and threaded from point 14 through cores 11 as shown, terminating at point 17. A study of the preferred embodiment of FIG. 2 discloses that the pattern of winding 16 is the inverted mirror image of the pattern of winding 15.

By splicing the ends of wires 15 and 16 arriving at point 17, a single winding is completed, which is equivalent to winding 12 of FIG. 1. However, the winding of FIG. 2 will have the advantages of being threaded through cores 11 in a shorter period of time, and with less cross-overs to accomplish a lower inter-line capacitance.

This latter statement may be best understood following a brief explanation of the cause of inter-line capacitance. Referring to FIG. 3, there is shown an enlarged perspective view of a portion of matrix 10, the view comprising four cores 11. To fully illustrate the wiring complexity, a pair of X drive windings 21, a pair of Y drive windings 22, and a pair of inhibit windings 23 are shown in their proper spacial relationship within the cores 11. The diameter of cores 11 has been exaggerated for clarity. Here winding 16 is shown as a sense winding.

It can be seen that sense winding 16 after passing through three of cores 11 will cross over itself at a point 19 prior to continuing on through the fourth core. Inasmuch as winding 16 must be lifted, by at least its own diameter, to accomplish this cross-over, it follows that the successive effect of many such cross-overs is to vary the level of the wires sufficiently to alter the mutual wire-spacing throughout the memory plane. This will effect the inter-line capacitance, which is directly related to the thickness of the dielectric (in this case, air in addition to the insulation coating on each wire). An electrical analysis of the dimensions and spacing of the various elements of a memory plane indicate that the disparity in inter-line capacitances between one part of the plane and another part is responsible for the occasional generation of noise, or spurious signals.

Reference to a cross-over point 19 in FIGS. 1 and 2 will be exemplary of how the method of this invention decreases the number of levels or cross-overs made in a single winding through the cores, such as a sense winding.

Referring first to FIG. 2, it will be seen that cross-over point 19 is the first point at which the wire 16 crosses back over its own path. Referring now to FIG. 1, a tracing of the path of prior art winding 12 will reveal that by the time crossover point 19 is reached, winding 12 has crossed its own path a minimum of 20 times. This constant crossing and recrossing of the path has the effect of continually alternating the level at which winding 12 lays with respect to the other lines, such as the X and Y drive windings 21 and 22, and the inhibit winding 23 of FIG. 3.

FIG. 4 discloses a variation of the method of this invention in which a matrix 10 comprised of magnetic ring cores 11 is wound with, for example, a sense winding. In this embodiment, a winding or wire 26 may be connected to a first threading needle (not shown) and beginning at point 24 may be wound, for example, through three rows of cores 11. Winding 25, dotted for clarity, may be connected to a second threading needle (not shown) and starting at point 23, may be wound, for example, through four rows of cores 11. Now winding 26 may be wound through another four rows of unwound cores 11, and the alternate sequence continues until all cores are wound.

If the above sequence is followed the two wires 25 and 26 will meet at a junction point 27, where they are spliced to form a single winding for matrix 10.

From the foregoing discussion it will be apparent that the improved method of this invention, which comprises the use of a plurality of threading devices such as needles to string, simultaneously or alternatively, a plurality of wires which are to be spliced together to make a single wire, provides a new and useful method for winding magnetic core memory storage devices. This method has been used in actual practice and it has been found that there is a definite decrease in production time, and thus a decrease in cost of the memory system. Further, it has been found that the quality of the memory system is greatly improved due to the decrease in noise, or spurious signals. This latter improvement is due to the decrease in inter-line capacitance achieved through winding the same number of magnetic ring cores with a decreased number of cross-overs for a single winding, such as the sense winding.

The embodiments of the invention in which an exclusive property or privilege is claimed are defined as follows:

1. In a memory storage device, including a matrix of bistable magnetic ring cores arranged in rows and columns with adjacent cores at 90° angles, and having a plurality of sets of row and column windings strung therethrough, the method of stringing a sense winding through the cores comprising the steps of:

(A) Attaching a first wire to a first core stringing needle;

(B) Attaching a second wire to a second core stringing needle;

(C) Passing the first needle through a first portion equal to one-half of the cores to thread the first wire therethrough along paths transverse to the row and column winding paths;

(D) Passing the second needle through the remaining portion equal to one-half of the cores to thread the second wire therethrough in an inverted mirror image of the threaded first wire; and (E) Splicing one end of the first wire to one end of the second wire to thus have a complete single sense winding strung through the cores of the matrix.

2. In a memory storage device, including a matrix of bistable magnetic ring cores arranged in rows and columns with adjacent cores at 90° angles, and having a plurality of sets of row and column windings strung therethrough, the method of stringing a sense winding through the cores comprising the steps of:

(A) Attaching each of a pair of wires to a separate threading apparatus;

(B) Diagonally threading a first pair of wires through a predetermined number of the cores in a predetermined pattern so that each of the predetermined cores is threaded only once;

(C) Diagonally threading the second of the pair of wires through the unstrung cores in a pattern which is the inverted mirror image of the threaded first wire, so that each core is threaded only once; and (D) Splicing the pair of wires to form one sense winding strung through the cores of the matrix.

3. In a memory storage device, including a matrix of bistable magnetic ring cores arranged in columns and rows and spaced so that diagonal rows in two directions are formed, the method of stringing a sense winding through the cores comprising the steps of:

(A) Attaching a first wire to a first core threading needle;

(B) Attaching a second wire to a second core threading needle;

(C) Starting at a corner of the matrix and threading the first wire through the cores in a predetermined number of the diagonal rows, beginning with a diagonal row in a first of the two directions and alternating directions after the complete threading of each diagonal row;

(D) Starting at the corner of the matrix at a core adjacent the first threaded core of Step C and threading the second wire through the cores in a second predetermined number of the diagonal rows, beginning with a diagonal row in a second of the two directions and alternating directions after the complete threading of each diagonal row;

(E) Threading the first wire through additional cores in a predetermined number of diagonal rows alternating directions after the complete threading of each diagonal row.

(F) Threading the second wire through additional cores in a predetermined number of diagonal rows alternating directions after the complete threading of each diagonal row.

(G) Repeating Steps E and F until all cores are strung once with either the first or second wire; and (H) Splicing the first and second wire to form one sense winding.

References Cited

UNITED STATES PATENTS

| | | | |
|---|---|---|---|
| 3,134,163 | 5/1964 | Luhn | 29—604 |
| 3,161,860 | 12/1964 | Grooteboer | 340—174 |
| 3,238,516 | 3/1966 | Hore | 340—174 |

JOHN F. CAMPBELL, *Primary Examiner.*

C. E. HALL, *Assistant Examiner.*

U.S. Cl. X.R.

340—174